Patented May 24, 1949

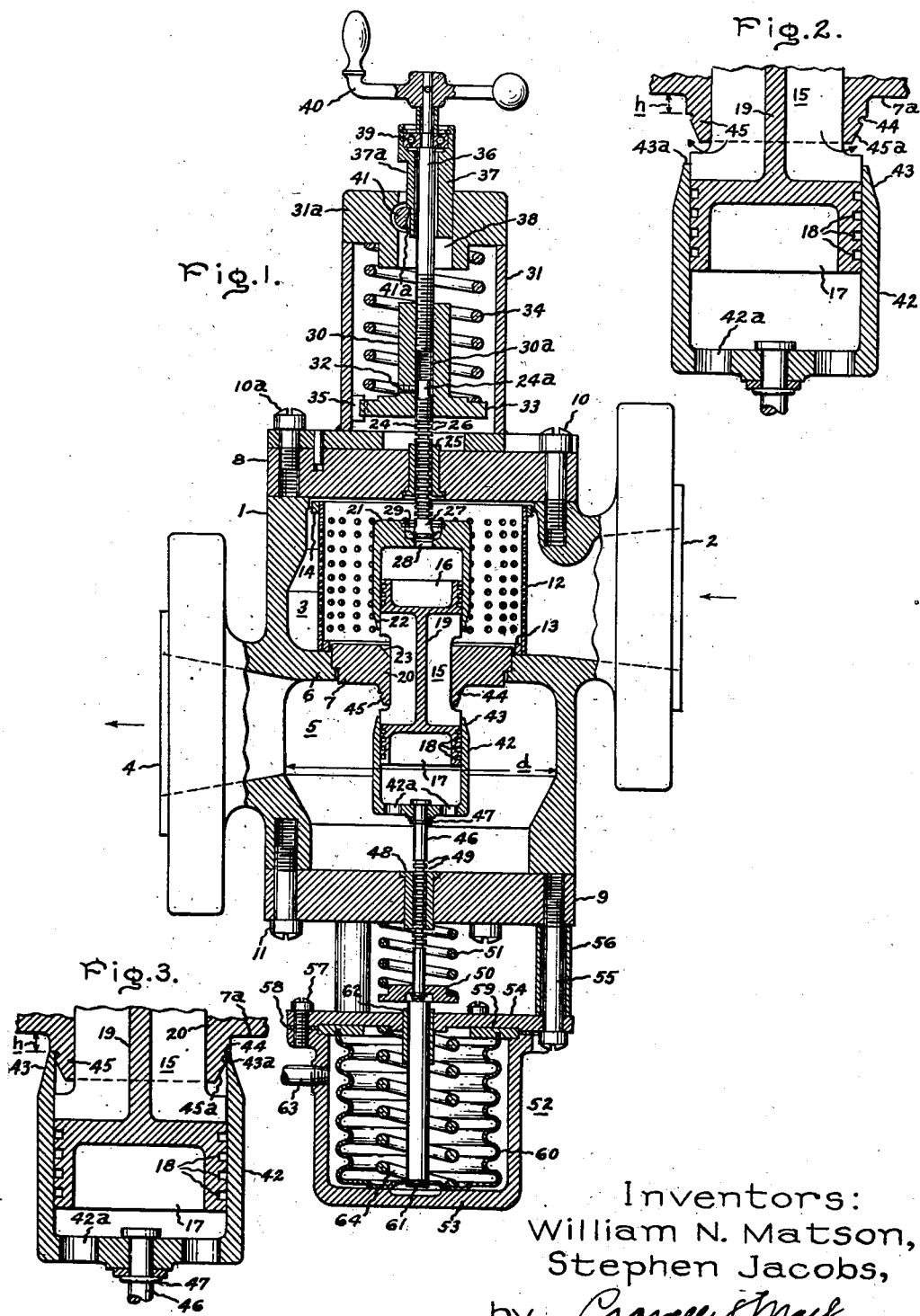

2,471,160

UNITED STATES PATENT OFFICE 2,471,160

COMBINATION BALANCED SHUTOFF AND THROTTLING VALVE ASSEMBLY

William N. Matson and Stephen Jacobs, Fitchburg, Mass., assignors to General Electric Company, a corporation of New York Application March 30, 1948, Serial No. 17,924

6 Claims. (Cl. 277—8)

1

This invention relates to an improved valve arrangement, particularly to a balanced valve for regulating a fluid pressure prime mover such as a steam turbine. The valve specifically disclosed herein is a particularly advantageous combination of an improved governing valve in accordance with the invention combined with a balanced shut-off valve of the same general type.

In the design of governing valves for prime movers, it is highly desirable to reduce to a minimum the operating force required to position the valve in order to reduce the power required and the size, weight, and cost of the valve actuating mechanism, and so that simple condition-responsive devices may be used without the interposition of complicated power amplifying devices. It is also desired that throughout the operating range of such a governing valve the net biasing force produced on the valve by the fluid, if any, be substantially constant in value so that the operation of the valve will be reliable and consistent throughout the entire range of operation. Specifically, it is desired that, with full fluid pressure applied to the inlet of the valve, the positioning force applied by the valve actuating mechanism be as nearly as possible a straight line function of the degree of opening of the valve.

Heretofore, many attempts have been made to produce a truly balanced governing valve; however the devices employed have been complicated and expensive, and subject to these objections: (1) The dynamic effect of the fluid rushing through the valve orifice produces a local static pressure condition adjacent the movable fluid control member, which static pressure varies as the position of the valve changes, so that a nonuniform extraneous force is introduced which makes the valve difficult to design in the first place and unreliable in service. (2) Furthermore, as the valve progressively opens, the "back pressure," at the downstream side of the valve increases. This back pressure is communicated to any unbalanced surface of the movable flow control member, which likewise introduces an extraneous force. (3) Also, the fluid flowing from the annular orifice produces a dynamic "jet reaction" on the movable member, due to the acceleration of the fluid at the orifice.

Accordingly, it is an object of this invention to provide an improved pressure fluid regulating valve which is simple and reliable mechanically, and so designed hydraulically that the above-mentioned factors have a minimum effect on the operation of the valve.

Another object is to provide a balanced govern-

2 ing valve of the type described in which the operating force required approaches very closely to a straight line function of the degree of valve opening.

A still further object is to provide a particularly advantageous arrangement for a combined governing valve and positive shut-off valve for a prime mover such as a steam turbine.

Other objects and advantages will be apparent from the following description taken in connection with the accompanying drawings, in which Fig. 1 is a complete assembly view, in section, of a combined shut-off and governing valve unit incorporating the invention; Fig. 2 is an enlarged detail view of the parts forming the annular valve orifice of the governing valve shown in Fig. 1; Fig. 3 is a similar enlarged detail view showing the movable member in fully closed position.

The combination shut-off and throttling valve shown in Fig. 1 consists of a housing 1 having a flanged inlet 2 defining a passage communicating with an inlet chamber 3, and a similar flanged outlet 4 defining a passage communicating with the discharge chamber 5. Separating the chambers 3, 5 is a wall 6 with a circular opening in which is a valve seat insert 7. The seat member 7 may be secured in the wall 6 by any suitable means, such as a few tack-welds. The fluid flow control means associated with the valve seat member 7 will be described more particularly hereinafter.

At either end of the housing 1 is a large circular opening closed by the respective head members 8, 9. These are secured to the housing by suitable threaded fastenings 10, 11 in a manner which will be apparent from Fig. 1.

Surrounding the valve seat member 7 in the inlet chamber 3 is a strainer in the form of a perforated cylinder 12 having at the bottom end an annular spacer member 13 for holding the strainer concentric with the seat member 7, and having a similar spacer member 14 surrounding the upper end of the strainer so as to hold it concentric with the head opening. Thus it will be seen that the strainer 12 sits freely in the inlet chamber, being accurately located by the spacers and the adjacent head member 8.

For slidably supporting the shut-off and governing valve flow control members, a double-ended piston member, indicated generally at 15, is secured in the valve seat member 7. As will be apparent from the drawings, the support member 15 has at either end thereof pistons 16, 17, either or both of which may be provided with conventional piston rings, or merely annular sealing grooves as shown at 18. The intermediate portion of member 15 consists of radially arranged ribs or webs 19 having end portions which are formed integral with, or welded to, the pistons 16, 17, and an intermediate outer portion engaging the periphery of the central opening in valve seat member 7, as indicated generally at 20. These web portions 20 may be welded to the seat member 7 or the member 15 may be secured in the seat member by any other suitable means.

The shut-off valve member consists of a cup-shaped piston 21 having an inner surface slidably disposed over the piston 16. The open end of piston 21 is beveled as shown at 22, and is adapted to engage the upper portion of a part of a conical surface 23 formed by a chamfer surrounding the central opening in member 7.

For positioning the shut-off valve member 21, an operating spindle 24 is provided, which projects slidably through a bushing 25 in the head member 8. To reduce leakage through the bushing 25, the spindle 24 may be provided with a plurality of concentric sealing grooves 26 in a manner which is well known in the art. The lower end of actuating spindle 24 is provided with a head member 27 disposed in a recess in the head of piston 21 and having a lower beveled surface forming a pilot valve for closing a central opening 28 in the piston head. Such pilot arrangements for fluid pressure valves are well known in the art, and the specific details of this feature are not necessary to an understanding of the present invention. It may be noted briefly however that when the spindle 24 descends to force the cup piston 21 into engagement with the valve seat member 7, the pilot valve head 27 engages the beveled seat surrounding opening 28 so that the pressure in inlet chamber 3 tends to force the cup piston 21 to closed position. When the valve actuating spindle 24 rises, a plurality of radially extending arms projecting from the head member 27 engage a retaining device, which may be in the form of a snap-ring 29. There is sufficient lost motion between the head member 27 and the retaining device 29, that by the time head 27 engages retainer 29 to lift the cup piston 21, the port 28 is fully opened so that inlet pressure from chamber 3 is communicated through port 28 to the interior chamber formed between cup piston 21 and the upper side of stationary piston 16. This pressure acting on the inner surface of piston 21 effectively balances it and reduces to a minimum the force required on spindle 24 to raise piston 21 to the fully open position.

The mechanism for actuating the spindle 24 includes an axially movable bushing 30 contained within a cylindrical housing 31 which may be secured to the head member 8 by means of threaded fastenings 10a. The bushing 30 is provided with a central axial bore 30a into which is threaded the upper end of spindle 24, being locked by a set-screw 32 engaging an unthreaded spindle end portion. The lower end of bushing 30 is provided with a radially extending flange 33 which forms a seat for one end of a biasing coil spring 34. The outer circumference of flange 33 may be provided with one or more axially extending grooves adapted to engage a longitudinal key member 35 fastened to the inner surface of housing 31, the engagement of this groove with the key member preventing relative rotation between the bushing 30 and housing 31.

Threaded into the upper end of bore 30a is a rotatable control rod 36 which projects freely through a bushing 37 slidably supported in a central opening 38 in the head of housing 31 and carrying the shaft 36 in an anti-friction bearing 39. For manual operation of the shut-off valve, a hand wheel or operating crank 40 is provided on rod 36. It will be apparent that rotation of the manual operating member 40 causes the threaded bushing 30 to move axially on the threaded end portion of actuating rod 36, which of course positions the valve actuating spindle 24. The upper end of coil spring 34 engages the under surface of housing head member 31a, so that the bushing 30 is always biased strongly downwardly.

For automatic actuation of the shut-off valve, a valve trip latch is provided. This consists of a rotatable shaft 41 supported in a transverse opening in the head member 31a and having a flat portion indicated at 41a, so arranged that when the flat 41a is parallel to the axis of spindle 36, bushing 37 may move freely downward under the action of biasing spring 34, so that the shut-off valve moves to closed position. A cutaway flat portion 37a forms a transverse shoulder on the bushing which engages the outer surface of the latch shaft 41, also providing a clearance space so that bushing 37 can slide downwardly past the latch shaft 41. Such latch arrangements are well known in the art and need not be discussed further here.

Referring now to the specific design details of the governing valve, to which the present invention is particularly related, the flow control member comprises a second cup-shaped piston 42 slidably disposed on the lower piston member 17 and having an upper beveled annular edge as indicated at 43. This edge is adapted to engage a narrow annular shoulder 44 formed as a discontinuity on a conical outer surface of an annular wall 45 projecting axially downward from the seat member 7. This engagement of the cup piston with its seat is shown in Fig. 3. The shape and arrangement of seat 44, wall 45, and the adjacent portions of the cup valve when in the open position, may be seen to an enlarged scale in Fig. 2. It will be observed that the cup piston terminates in a long, gradually tapered surface 43 with a very narrow annular edge 43a adapted to engage the cooperating annular seat 44 of the tapered annular wall 45. Attention is particularly directed to the fact that the annular seat 44 is spaced axially by a distance $h$ from the nearest radially extending wall of seat member 7. The significance of this dimension will be pointed out more particularly hereinafter.

During operation, a small amount of fluid will leak past the piston 17 into the chamber formed between piston 17 and the adjacent end of cup piston 42. If unrelieved, the pressure built up in this chamber would produce a biasing force on the piston 42, which extraneous force would make the operation of the valve difficult to predict. Therefore, the head of cup piston 42 is provided with a number of generously proportioned openings 42a, which insure that the pressure within the piston 42 will be equal to that existing in the chamber 5 outside the piston.

Because of the extremely small operating force required to position the governing valve, the actuating spindle 46 is made of comparatively small diameter, for a reason noted hereinafter. Spindle 46 is connected to the head of cup piston 42 by any suitable fastening device, for instance the "snap-ring" 47, which seats in an annular groove in spindle 46 in a manner which will be understood by those skilled in the art. It may be noted that the piston 42 is preferably not rigidly fixed to spindle 46. The connection should be somewhat flexible so that the piston may be guided accurately by the stationary piston 17, and so that it may be slightly self-aligning so as to seat accurately on the annular surface 44 of the wall 45. Spindle 46 projects through a bushing 48 in the head member 9 and is provided with annular sealing grooves 49, terminating at a radially extending flange member 50 which serves as one abutment for a coil spring 51, the other end of which engages the outer surface of head member 9 so that spindle 46 is biased downwardly. The flange 50 may be secured on spindle 46 by means of a snap-ring or other suitable fastening.

For positioning the spindle 46, a hydraulic motor indicated generally at 52 is provided. This comprises a housing 53 having a disk-shaped base 54 supported from head member 9 by means of three screws 55 passing through tubular spacers 56. The housing 53 is clamped to the base 54 by means of a plurality of threaded fastenings 57, there being a gasket 58 between to provide a fluidtight joint. Also clamped between housing 53 and base 54 is an annular disk member 59 to which is secured, as by welding, the annular edge of a cup-shaped flexible bellows 60. Within bellows 60 is an actuating rod 61, which may be riveted to the central portion of the free end of bellows 60, and projects slidably through a bushing 62 in base member 54. The exterior end of the rod 61 abuts freely against the adjacent end of valve actuating spindle 46, there being no rigid connection therebetween. This arrangement is highly advantageous from a practical standpoint, for any slight misalignment introduced into the assembly when the hydraulic motor 52 is mounted on the head member 9, will not introduce any bending forces into the small diameter spindle 46. Likewise, it is not necessary that the hydraulic motor be exactly aligned in concentric relation with the spindle 46. It will be obvious that the end of actuating rod 61 is large enough in diameter that it will properly engage the end of spindle 46 regardless of any slight eccentricity therebetween. It will also be apparent that spring 51 firmly biases the flange 50 and actuating rod 46 into engagement with the adjacent end of rod 61.

Actuating liquid at a suitable pressure is introduced through a conduit 63 to the annular chamber formed between the bellows 60 and the inner surface of housing 53. This pressure acting on the end surface of bellows 60 causes the rod 61 to move upwardly against the bias of spring 64 so as to position valve actuating spindle 46 against the further bias of the spring 51. It will be apparent therefore that the position of the cup piston 42, when no pressure fluid is flowing into the inlet 2, is a function of the oil pressure supplied to the hydraulic motor 52 and the mechanical characteristics of the biasing springs 51, 64. With suitable design by well known methods, it is readily possible to make the axial position of the cup piston 42 a straight-line function of the operating pressure in the hydraulic motor.

For high temperature service, the cup valves 42, 21, and the piston members 16, 17 are made of suitable chrome steel and are preferably provided with cooperating portions having nitrided surfaces, of a hardness of about 75 Rockwell C, in order to reduce "galling" and resulting sticking of the moving parts.

Having described the mechanical construction of our improved valve assembly, the operation is as follows. The arrangement is particularly advantageous when used as a combined stop and governing valve for an elastic fluid pressure machine such as a steam turbine. In such service steam at a substantially constant pressure and temperature is supplied to the flanged inlet 2.

To start operation, assuming the stop valve 21 had previously been tripped to closed position, the manual handle 40 is rotated in the closing direction. This causes bushing 37 and the threaded spindle 36 to rise in bushing 30. When the bushing 37 has been raised sufficiently, the latch shaft 41 may be manually rotated, by an operating handle which is not shown, to engage the shoulder in the cutaway bushing portion 37a. The handle 40 may then be rotated in the proper direction to open the valve. This will cause bushing 30 to rise on spindle 36, carrying with it the spindle 24. As spindle 24 begins to rise, pilot valve 27 uncovers port 28 so that pressure is equalized across cup piston 21. Subsequent movement of spindle 24 upwardly lifts the cup 21 to its open position. While the stop piston valve 21 is ordinarily either in the wide open or closed position, it may be manually opened to an intermediate position for "throttling" the steam supply, as for instance in starting a turbine.

It will be appreciated by those skilled in the art that the latch 41 may be under the control of some automatic device responsive to turbine speed (not shown), so arranged that upon a predetermined over-speed condition the latch rotates and the bushing 37 descends to close the shut-off valve. Such arrangements are well known in the turbine art.

With the stop valve 21 in the fully open position, as shown in Fig. 1, fluid flows readily through the perforated strainer 12 and through the annular orifice defined by the edge of the cup piston and the adjacent beveled surface 23 of the valve seat 7. By reason of the bevel 22 on piston 21 and the bevel 23 on the seat member 7, the fluid flows into the circular opening defined by the valve seat 7 member with a very definite axial component downwardly, which facilitates the smooth flow of fluid through the valve seat opening.

As indicated above, it is desired that the position of the governing valve 42 be as near as possible to a straight line function of the pressure of the operating liquid supplied to the hydraulic motor 52. As indicated above, it is comparatively easy to so design the hydraulic motor and the biasing springs that this condition will be obtained with no fluid flowing through the valve. However, when steam flows at varying rates through the valve, assuming constant inlet pressure and temperature, substantial extraneous forces are introduced into the system by the following factors: 1. The kinetic energy of the fluid flowing rapidly through the annular valve orifice is converted back, to a greater or lesser extent, into static pressure in the region immediately surrounding the valve cup piston. This produces a local pressure condition which acts on any adjacent parts of the moving valve member, so that a force component in the direction of movement of the valve member is produced.

This local static pressure changes as the valve's opening increases, being greatest when the valve first opens and progressively decreasing as the valve opening increases. 2. Furthermore, as the valve progressively opens, the "back pressure" existing in the chamber 5 increases, and this back pressure is communicated to the upper or internal end of the valve positioning spindle 46, the other end of which is exposed to atmospheric pressure. Thus, there is a differential pressure acting on the valve stem 46, with a resulting biasing force downward, that is in the opening direction of the governing valve.

It will be seen that the above two effects tend to compensate each other. The net effect of these two extraneous factors is to produce an operating curve which is not the desired straight-line function; but, by proper design in accordance with our invention, the characteristic curve can be made substantially straight, and substantially parallel to that curve which is obtained when no fluid is flowing. To this end the following design factors must be carefully considered in order that the valve will have a characteristic curve approaching as closely as possible to the desired straight-line function.

We have discovered that in order to reduce the localized static pressure resulting from conversion of the kinetic energy of the flowing fluid, the narrow annular valve seat 44 must be at least a certain minimum distance spaced axially from the adjacent annular surface 7a of the seat member 7. This distance is labelled $h$ in Fig. 2. Much analysis and testing has shown that this minimum distance is of the order of a quarter of an inch. For conservative design, this distance may be greater but should not be less than a quarter of an inch.

It has been discovered that with a valve of the configuration shown in the drawing, the rapidly-flowing fluid has a tendency to deflect upwardly and be discharged through the annular valve orifice substantially as indicated by the flow arrows in Fig. 2. To facilitate this flow, the beveled surface 45a is provided at the end of the depending annular wall 45. This tapered surface 45a may be designed with a carefully calculated contour so as to produce a pre-selected variation in effective valve orifice area as a function of valve travel. It will be apparent that, as the edge 43a of the cup piston 42 leaves the annular seat 44, the edge of the cup piston forms an increasing annular orifice with the surface 45a. By giving the surface 45a an appropriate contour, it is possible to compensate for the effect of changes in the "restriction factor" which occur as a result of decreasing pressure ratio across the orifice. This compensating effect can be made to produce a substantially straight-line function of flow versus valve travel over the range in which the edge 43a of the cup piston 42 is adjacent the surface 45a. After the edge 43a of piston 42 moves beyond the extreme end of the surface 45a the effective area of the orifice will increase very closely as a straight-line function of the valve travel.

It has also been determined that the discharge chamber in the valve immediately surrounding the annular discharge orifice should be generously proportioned so as to prevent the build-up of a localized static pressure. Specifically, the inner diameter labelled $d$ in Fig. 1 should be of the order of twice the diameter of the cup valve 42, or larger. This proportioning permits the rapidly-flowing fluid to get away quickly from the annular regulating orifice without building up a local static pressure condition.

A further reason for making the inner chamber diameter $d$ of the size specified is that if it is smaller, there may be an unbalanced pressure distribution circumferentially around the piston 42, with the result that a transverse thrust will be produced on the piston, introducing friction into the operation. Such friction forces are likely to be erratic and therefore affect operation of the valve adversely.

It is also desirable that the annular seating surface 43a of the valve cup 42 be as small in area as possible, consistent with manufacturing convenience and mechanical strength of the parts, so that any local static pressure condition which may be created will act on a minimum area. It is also necessary to provide a long gradual taper on the outer surface of valve cup 42, adjacent the seating surface 43a, as indicated at 43 in Fig. 2. With a very narrow seat 43a and a long gradual taper 43, there is a minimum "effective projected area" for any local static pressure to act upon. This taper may, for instance, be at an angle of about 15° with the axis of the piston.

When the cup piston 42 is in its fully closed position, there will inevitably be a certain small amount of leakage through the clearance spaces between the stationary piston 17 and the movable piston 42. This leakage flow of course tends to build up a pressure in the chamber defined between the two pistons. If this build-up of pressure should be permitted, it would of course produce a net biasing force on the movable piston 42. To prevent the introduction of this extraneous force, we have found it necessary to make the pressure balancing holes 42a of a cross-sectional area many times greater than that of the leakage past the piston 17. Specifically, it has been found that the holes 42a should have an aggregate area at least fifty times the effective area of the leakage path. With this proportioning, the pressure in the space enclosed by the pistons 17, 42 will be very closely equal to that in the chamber 5.

Because the forces required to position the cup piston 42 are so small, the spindle 46 may be of very small diameter, which is valuable as this tends to reduce the unbalanced force acting on the spindle 46 due to the differential between the pressure within piston 42 acting on one end of the spindle and atmospheric pressure acting on the other end. Therefore, spindle 46 should be made just as small in diameter as is feasible from the standpoint of mechanical strength and stiffness. Further, reducing the size of spindle 46 decreases the leakage through the clearance space between spindle 46 and bushing 48.

Attention is directed to the relation between the effective area of the annual orifice defined between the lower edge of cup piston 21 and the beveled valve seat 23, the area of the parallel passages defined between the webs 15 and the bore portion 20 of the valve seat member 7, and the variable annular orifice defined by the upper edge of the cup piston 42 and the beveled surface 45a. The parts are carefully designed so that the maximum effective area of the last-mentioned orifice is smaller than that formed by the cup piston 21 or the aggregate area of the parallel paths formed between the webs 15. With this arrangement, in which the shut-off valve formed by the cup piston 21 and the governing valve formed by the cup piston 42 are closely adjacent each other and connected by the paths formed between webs 15, there is only one major restriction in the flow path from the inlet chamber 3 to the outlet chamber 5. Thus the fluid experiences only one major pressure reducing expansion, namely at the annular orifice formed by the governing piston 42. With a separate shut-off valve in series flow relation with a governing valve, as ordinarily used in conventional steam turbine practice, the motive fluid experiences at least two substantial pressure drops, one in each valve, with a certain amount of diffusion, turbulence, and loss of kinetic energy in the conduit connecting the two valves. With the present arrangement, these losses inherent in the prior art arrangements are greatly reduced because, as pointed out above, there is only one material restriction to the fluid flow. Also, the cooperating bevels 22 on the cup piston 21 and 23 on the valve seat member 7 tend to cause the fluid to flow into the passages between the webs 15 with a substantial axial component so that any velocity energy acquired by the fluid flowing past the beveled seat 23 is not dissipated wastefully. Thus any minor pressure drop across the shut-off valve cup piston 21 does not cause any substantial loss of energy. By arranging the stop valve and governing valve in the close-coupled manner shown in the drawing, a substantial improvement in the overall energy losses inherent in the valve assembly is obtained.

It has been found that a governing valve in accordance with the invention will have an operating characteristic curve approaching very closely to the desired straight-line function. Because of the substantial elimination of all extraneous forces, the valve is reliable and consistent in operation. Very important is the extremely small operating force required to position the governing valve. For instance, with a valve designed for 600 lbs. per square inch pressure and 750° F., and of a capacity for handling about 16,000 lbs. per hour of steam, the maximum force due to unbalanced fluid pressure on the governing valve piston 42 has been found to be under 10 pounds. Thus, comparatively light biasing springs 51, 64 may be used, and the hydraulic operating motor 52 may be correspondingly small. By combining the stop valve and governing valve in the manner shown in Fig. 1, a particularly inexpensive, neat, compact, and light assembly is provided, as compared with the arrangements of the prior art in which the stop and governing valves were built separately and connected by piping.

While a specific embodiment of the invention has been described, it will be appreciated by those skilled in the art that many modifications of various details of the structure shown might be made, and it is intended by the appended claims to cover all such changes as fall within the true spirit and scope of the invention.

What we claimed as new and desire to secure by Letters Patent of the United States is:

1. A combined shut-off and throttling valve assembly for elastic fluid comprising a housing forming an inlet chamber and an outlet chamber separated by a wall defining a circular valve seat opening, means secured in said opening and forming axially spaced stationary piston members concentric with the opening, each piston being of a diameter larger than the opening and spaced axially away therefrom on opposite sides thereof, said wall having a first annular beveled portion surrounding the opening adjacent the inlet chamber and a second annular portion surrounding the opening and projecting axially into the discharge chamber, said second annular wall portion having a substantially conical tapering outer surface adjacent the end thereof and a narrow annular seat portion axially spaced from the end thereof, a first cup piston member having a cylindrical inner surface slidably disposed over the stationary piston member in the inlet chamber, means for positioning the first cup piston including an axially slidable valve actuating stem and pilot valve means adapted to communicate pressure fluid in the inlet chamber to the space defined between the first cup piston and the cooperating stationary piston member, the outer surface of the first cup piston being beveled inwardly to form a narrow annular edge adapted to sealingly engage the wall surrounding said first beveled annular portion, a second cup piston member having an inner cylindrical bore slidably disposed over the other stationary piston member, the second piston having a tapered substantially conical outer surface terminating in an annular edge adapted to sealingly engage said annular valve seat, the inner diameter of the outlet chamber being of the order of two times the diameter of said annular seat, said last-mentioned seat being spaced at least one-quarter inch axially from adjacent wall surfaces surrounding the valve opening, a second valve-actuating stem connected to the bottom of the second cup piston and projecting slidably through an adjacent wall of the housing, the second cup piston having pressure balancing port means for substantially equalizing the pressure in the discharge chamber with that between the moving piston and the cooperating stationary piston, the second actuating stem being of a minimum diameter whereby a minimum force is exerted thereon by the fluid pressure in the outlet chamber, the relative dimensions of the parts defining the fluid path from inlet to outlet chamber being so proportioned that in normal operation the minimum flow path area occurs at the annular throttling orifice defined by the second cup piston, whereby energy losses in the valve assembly are minimized.

2. A combined shut-off and throttling valve assembly for elastic fluid comprising a housing forming an inlet chamber and an outlet chamber separated by a wall defining a valve seat opening, means secured in said opening and forming axially spaced stationary piston members concentric with the opening, each piston being of a diameter larger than the opening and spaced axially away therefrom on opposite sides thereof, said wall having an annular portion surrounding the opening and projecting axially into the discharge chamber with a substantially conical tapering outer surface adjacent the end thereof and a narrow annular seat portion axially spaced from the end thereof, a first cup piston member having a cylindrical inner surface slidably disposed over the stationary piston in the inlet chamber, means for positioning said first cup piston, the outer surface of the first cup piston being beveled inwardly to form a narrow annular edge adapted to sealingly engage the walls surrounding the valve seat opening, the wall portion surrounding the valve seat opening being contoured to cooperate with the tapered end of the first cup piston and direct elastic fluid in the inlet chamber into the valve seat opening with a substantial axial component towards the discharge chamber, a second cup piston member having an inner cylindrical bore slidably disposed over the other stationary piston member and having a tapered substantially conical outer surface terminating in an annular edge adapted to sealingly engage said annular seat, the inner diameter of the outlet chamber being of the order of two times the diameter of said annular seat, said last-mentioned seat being spaced at least one-quarter inch axially from the adjacent wall surfaces surrounding the valve opening, a valve actuating stem connected to the bottom of the second cup piston and projecting slidably through an adjacent wall of the housing, the second piston having pressure balancing port means for substantially equalizing the pressure in the discharge chamber with that between the moving piston and the cooperating stationary piston, the relative dimensions of the parts defining the fluid path from inlet to outlet chamber being so proportioned that in normal operation there is only one substantial pressure drop, which occurs at the annular throttling orifice defined by the second cup piston, whereby energy losses in the valve assembly are minimized.

3. A combined shut-off and throttling valve assembly for elastic fluid comprising a housing defining an inlet chamber and an outlet chamber separated by a wall forming a circular valve seat opening, means secured in said opening and forming axially spaced stationary pistons coaxial with the opening and spaced axially away therefrom on opposite sides thereof, said wall having an annular portion surrounding the opening and projecting axially into the discharge chamber, said second annular wall portion having a substantially conical tapering outer surface adjacent the end thereof and a narrow annular seat portion axially spaced from the end thereof, a first cup piston member having a cylindrical inner surface slidably disposed over the stationary piston member in the inlet chamber, means for positioning the first cup piston, the first cup piston and said wall surrounding the wall seat opening adjacent the inlet chamber being provided with cooperating surfaces adapted to direct the fluid into the valve seat opening with a substantial axial component toward the discharge chamber, a second cup piston member having an inner cylindrical bore slidably disposed over the other stationary piston member, the second piston having a tapered substantially conical outer surface terminating in an annular edge adapted to sealingly engage said annular valve seat, said narrow annular seat being so spaced axially from the adjacent portions of said wall and the inner diameter of the outlet chamber being so spaced from said annular seat that no substantial local static pressure condition is created adjacent the annular edge of the second piston nor on the outer circumferential surface thereof, a valve actuating stem connected to the bottom of the second cup piston and projecting slidably through an adjacent wall of the housing, the second piston having pressure balancing port means for substantially equalizing the pressure in the discharge chamber with that between the moving piston and its cooperating stationary piston, said second stem being of a minimum diameter whereby the force exerted thereon by the fluid pressure in the outlet chamber is minimized, the relative dimensions of the parts defining the fluid path from inlet to outlet chamber being so proportioned that the minimum flow path area occurs at the annular throttling orifice defined by the second cup piston, whereby the operating force required and energy losses in the valve assembly are minimized.

4. In a regulating valve for elastic fluid, the combination of a housing defining an outlet chamber with a valve seat member forming a circular valve seat opening, means secured in said opening and supporting a stationary piston coaxial with the opening, said piston being of a larger diameter than the opening and spaced axially away therefrom in the outlet chamber, a cup-shaped piston slidably disposed over the stationary piston with an annular edge adjacent the valve seat member, said seat member having an annular portion extending axially toward and defining an annular passage with the stationary piston, said annular portion having a substantially conical tapering outer surface adjacent the end thereof and a narrow annular seat portion axially spaced from the end thereof, the annular edge of the cup piston having a narrow annular surface adapted to sealingly engage said annular valve seat and a tapered substantially conical outer surface adjacent said edge, the outlet chamber having a minimum inner diameter of the order of two times the diameter of said annular seat and the stationary seat being spaced at least one-quarter inch axially from the adjacent wall surfaces surrounding the valve opening, and a valve actuating stem connected to the bottom of the cup piston and slidably projecting through the adjacent wall of the housing, the cup piston having pressure balancing port means for substantially equalizing the pressure in the discharge chamber with that existing between the stationary and cup pistons, said actuating stem being of a minimum diameter so as to reduce the force exerted on the stem by the fluid pressure in the outlet chamber.

5. A regulating valve in accordance with claim 4 in which the effective area of the pressure balancing port means in the cup piston is of the order of fifty times the area of the leakage path between the cup piston and its cooperating stationary piston.

6. In a regulating valve for elastic fluid, the combination of a housing defining an outlet chamber with a valve seat member forming a valve seat opening, means projecting through said opening and supporting a stationary piston coaxial with the opening, said piston being of a larger diameter than the opening and spaced axially away therefrom in the outlet chamber, a cup-shaped piston slidably disposed over the stationary piston with an annular edge adjacent the valve seat member, said seat member having an annular portion extending axially toward and defining an annular passage with the stationary piston, said annular portion having a substantially conical tapering outer surface adjacent the end thereof and a narrow annular seat portion axially spaced from the end thereof, the annular edge of the cup piston having a narrow annular surface adapted to sealingly engage said annular seat and a tapered substantially conical outer surface adjacent said edge, said annular valve seat being sufficiently spaced axially from the adjacent wall surface surrounding the valve opening and the outlet chamber being of an inner diameter sufficiently greater than the diameter of said annular valve seat that the fluid can escape through the orifice defined by said annular seat portion and the cooperating edge of the cup piston without creating localized static pressure conditions which would impose either axial or transverse forces on the cup piston, and means for positioning the cup piston, the cup piston having pressure balancing port means for substantially equalizing the pressure in the discharge chamber with that existing between the stationary and cup pistons.

WILLIAM N. MATSON.
STEPHEN JACOBS.

REFERENCES CITED

The following references are of record in the file of this patent:

UNITED STATES PATENTS

| Number | Name | Date |
|---|---|---|
| 712,009 | Schutte | Oct. 28, 1902 |
| 1,867,195 | Teller | July 12, 1932 |
| 1,956,987 | Hose | May 1, 1934 |